Oct. 30, 1928.  
W. NOBLE ET AL  
1,690,031  
VALVE OPERATING SYSTEM  
Filed April 14, 1927  
4 Sheets-Sheet 1
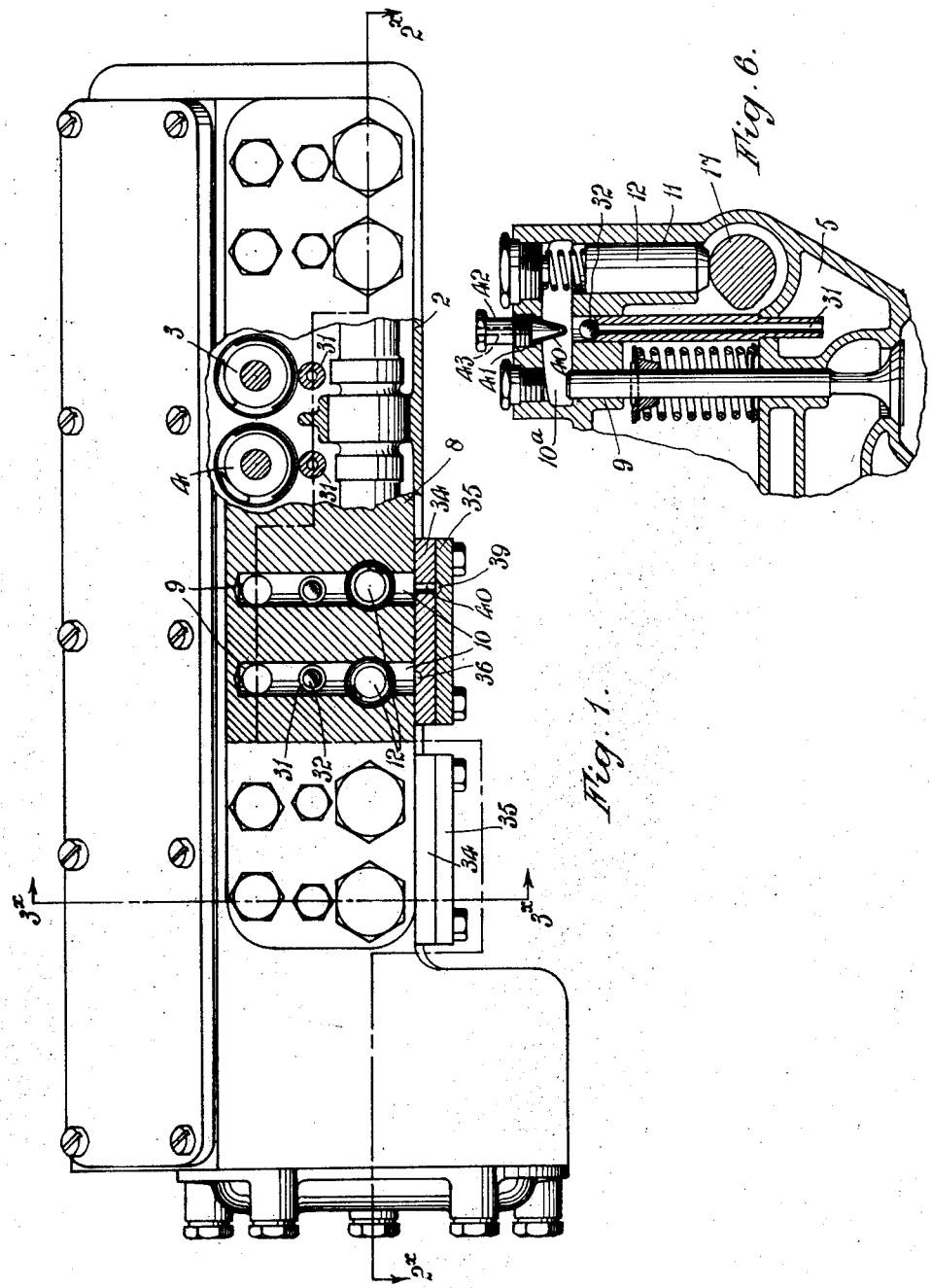
Warren Noble  
Leon J. Pittman  
INVENTORS
BY  
ATTORNEYS Oct. 30, 1928.
W. NOBLE ET AL
1,690,031
VALVE OPERATING SYSTEM
Filed April 14, 1927    4 Sheets-Sheet 2
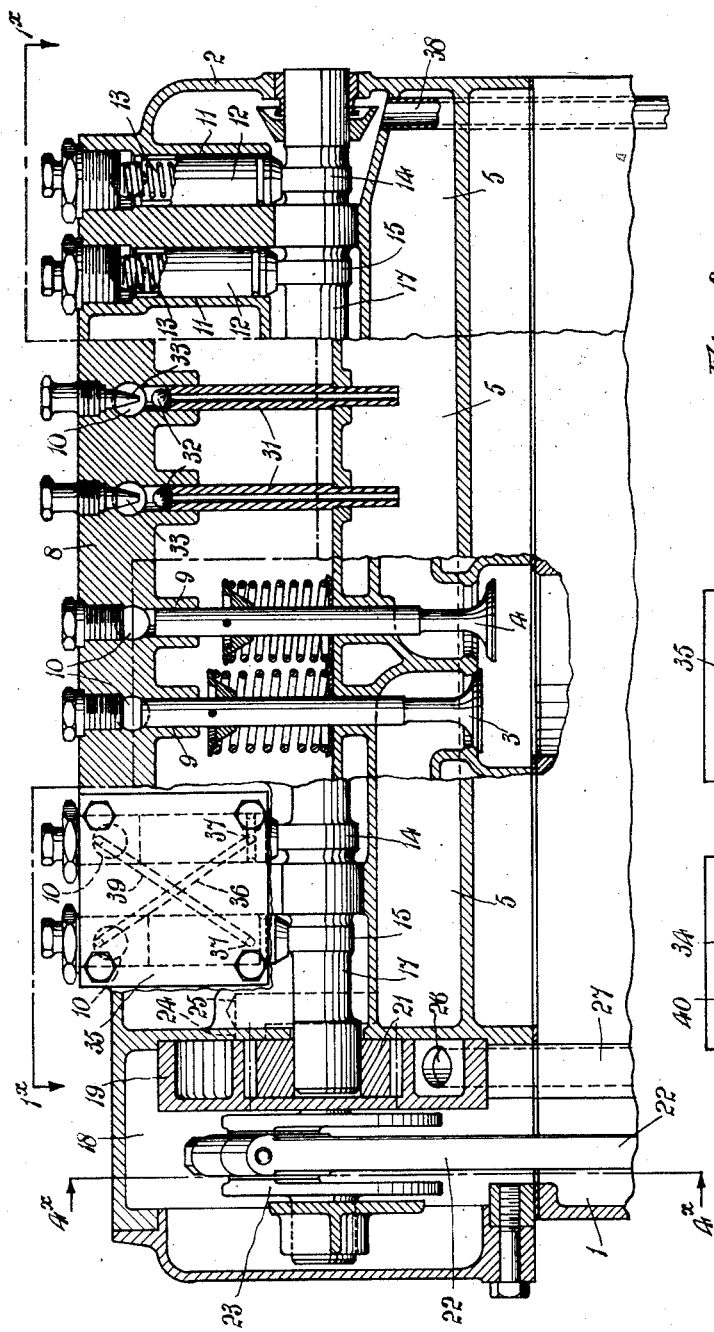

Patented Oct. 30, 1928.

1,690,031

UNITED STATES PATENT OFFICE.

WARREN NOBLE AND LEON V. PITTMAN, OF DETROIT, MICHIGAN; SAID PITTMAN ASSIGNOR TO SAID NOBLE.

VALVE-OPERATING SYSTEM.

Application filed April 14, 1927. Serial No. 183,710.

This invention relates to internal combustion engines more particularly of the type employing puppet valves for inlet and exhaust control, and has for its object to provide a form of cylinder head and mechanism carried thereby which will render the operation and control of the valves very simple and reliable and which will especially lend itself to the incorporation therein of a hydraulic valve operating system, and the maintenance of said system in an efficient hydraulic adjustment which will require a minimum of attention for efficient and continuous operation.

In the co-pending application of Warren Noble, Serial Number 180,119 filed the 28th day of March, 1927, is described a hydraulic valve gear, in which provision is made for the effective elimination of entrained or otherwise accumulated air in the system so that proper translation of a cam actuated plunger, through an oil column, into movement of a valve will be ensured; and the present invention provides for a simple and compact incorporation of the principles set forth in the said co-pending application in a cylinder head design and in a manner lending itself excellently to commercial production.

A further object of the invention is to provide, in the cylinder head of an internal combustion engine, a self-contained valve actuating system including hydraulic actuating means, a camshaft operating said valve actuating means and a pump circulating oil or hydraulic fluid to the said valve actuating means for the replenishing of oil therein and for the flushing of air therefrom; and has as a further object to provide in combination with the said hydraulic means incorporated in the cylinder head of an internal combustion engine, camshaft gearing also carried by the cylinder head and actuating as a pump for the supplying of oil to the said hydraulic means.

The said invention further contemplates the utilizing of oil circulated in connection with the replenishing of oil in said hydraulic means as a cooling fluid for the cylinder or cylinders of an internal combustion engine with which said hydraulic means are used.

Still further objects or advantages subsidiary or incidental to the aforesaid objects, or resulting from the construction or operation of the invention as it may be carried into effect, will become apparent as the said invention is hereinafter further disclosed.

In carrying the said invention into effect, we may provide a detachable cylinder head structure for the cylinder block of an internal combustion engine, said head having a pressure oil chamber therein adapted to operate as part of an oil cooling system for the cylinders of the engine, inlet and exhaust valves suitably mounted in said head having the ends of their stems exposed to individual chambers formed in the head, which chambers also have exposed thereto the ends of valve-actuating plungers adapted to operate said valves through oil trapped in said individual chambers. The plungers of the inlet and exhaust valves of each cylinder control the opening of interconnecting passages in such manner that the actuation of the inlet plunger is effected against a closed column of oil in its individual chamber, but temporarily opens the column of oil in the individual chamber of the other plunger to oil flow therethrough for the scavenging of air therefrom and for oil replenishing therein. The plungers are operated by a gear driven camshaft located in the cylinder head structure, the gears being encased and located within the cylinder head structure to act as a pump for the delivery of oil to the said individual chambers to effect flow periodically therethrough in the manner referred to. Means are provided for transmitting motion of the crankshaft of the engine to the camshaft gears in the head of the engine as in the manner described in the co-pending application of Warren Noble, Serial Number 182,668 filed the 11th day of April, 1927.

The present invention is more particularly described and ascertained hereinafter, by way of example, having reference to the accompanying drawings, wherein:—

Figure 1 is a sectional plan of the cylinder head of an engine embodying the said invention, the section being taken on planes indicated by the line 1ˣ . . . 1ˣ in Figure 2;

Figure 2 is a sectional elevation of the same, the section being taken on planes indicated by the line 2ˣ . . . 2ˣ in Figure 1;

Figure 6 is a further fragmentary detail section taken on the same plane as Figure 3, illustrating a modified form of air bleed valve arranged for manual operation; and Figures 7 and 8 are detailed elevations showing the faces of two plates provided with air bleed passages utilized in the form of the invention shown in Figures 1 to 5, inclusive.

Similar characters of reference indicate similar parts in the several figures of the drawings.

Figures 3, 5:
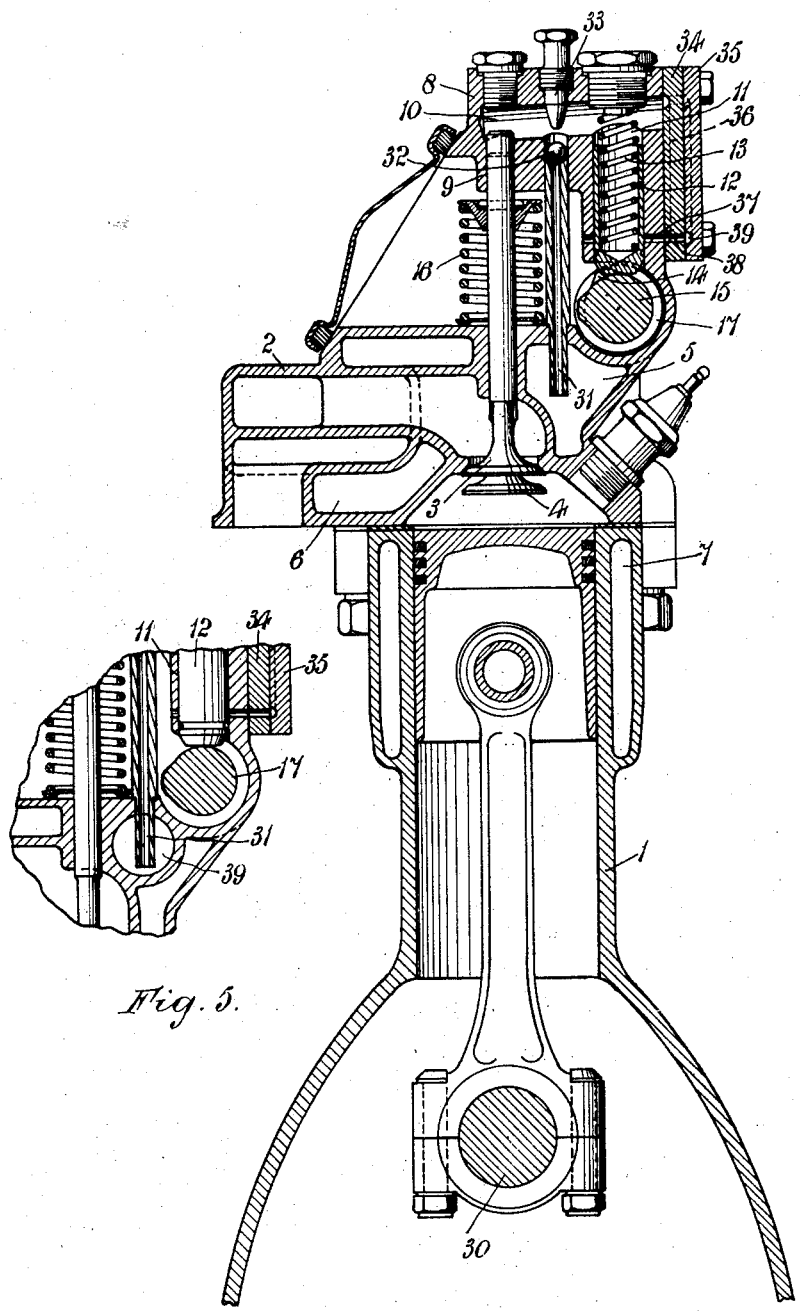
Figure 3 is a vertical transverse section of part of an engine including the cylinder head structure shown in Figures 1 and 2, the section being taken on the line 3ˣ . . . 3ˣ in Figure 1.
Figure 5 is a fragmentary detail sectional view taken on the same plane as Figure 3, illustrating a modified form of oil manifold.
Figure 4:
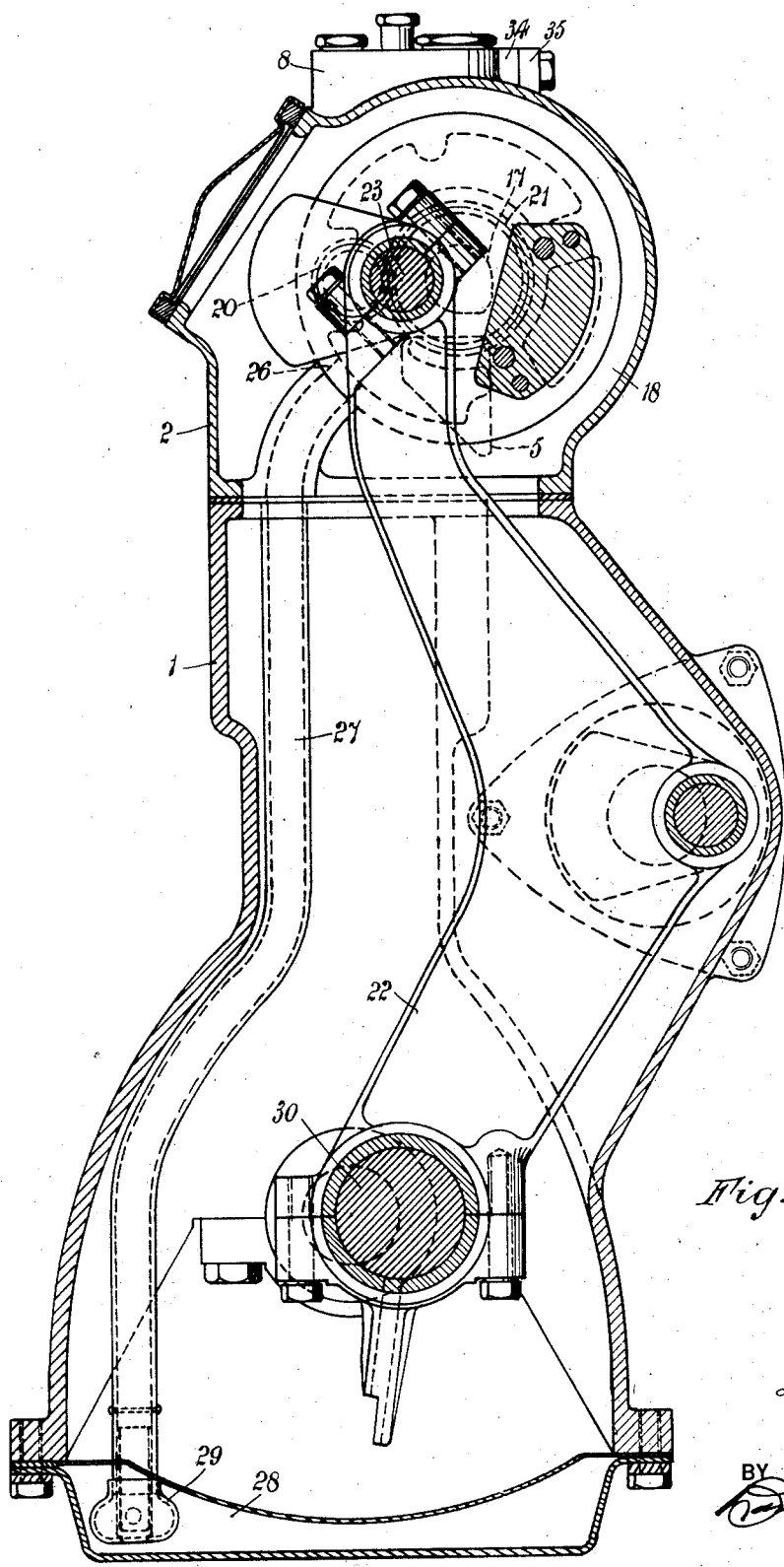
Figure 4 is a similar transverse section taken on the line 4ˣ ... 4ˣ of Figure 2.

1 is an internal combustion engine having a cylinder head 2 which is preferably detachable, and which in its association with present invention has many beneficial features attending its detachable nature and its general mechanical arrangement as will hereinafter become apparent. The said cylinder head has inlet and exhaust valves 3 and 4 mounted therein for each of the engine cylinders, and the head is chambered to provide a pressure oil passage 5, which may also communicate by suitable passages (not shown in detail) with chambers, such as 6 and 7 for the oil cooling of the engine cylinder.

The said cylinder head structure is provided with an upper structure 8, (hereinafter called the "actuator housing") which overhangs the said valves and is ported at 9 to receive the upper ends of the stems of the said valves so that the extremities of these stems are exposed to the interior of chambers 10 formed in the said actuator housing 8 immediately above each valve stem. These chambers extend transversely of the head and are inclined so that they are somewhat higher at one end than at the other.

The said actuator housing 8 is also bored at 11 to provide actuator cylinders opening into each of the said chambers 10, the said actuator cylinders housing actuator plungers 12 which are pressed by springs 13 into contact with inlet and exhaust valve actuating cams 14 and 15, respectively, so that the actuating of the inlet and exhasut valves in timed relation is effected by moving the said plungers against closed bodies of oil or suitable hydraulic fluid in the said chambers 10. It will be apparent that the lifting of any one of the plungers 12 in its cylinder 11 against such closed body of oil in its chamber 10, will produce a corresponding movement, outwardly of the said chamber, of the stem of the valve exposed thereto, this movement being effected against the resistance of a valve spring 16 provided to return the valve to its seated position after operation and incidentally, through the oil column, to return the plunger to a position riding the base circle of its cam after the lobe of cam has passed beyond the plunger.

The camshaft 17 extends longitudinally through the cylinders head structure immediately beneath the said plungers 12, and its rear end extends into a cam gear chamber 18 provided in the rear end of the said cylinder head structure. This chamber is shown as housing the upper mechanism of a camshaft drive the full nature and operation of which is described in the co-pending application, Serial Number 182,668 hereinbefore referred to, and includes a pump casing 19 housing pump gears 20 and 21 through which the cam shaft is also operated from the crankshaft 30 of the engine by a connecting rod 22 and crank 23 which is coupled to the said gear 20, the gear 21 being mounted on the rear end of the said camshaft 17.

The discharge outlet 24 of the pump casing 19 opens into a passage 25 leading to the oil manifold 5, and maintains this manifold charged with oil under pressure. 26 is the inlet to the pump casing which, in this example is connected with an oil feed pipe 27 the bore of which extends into an oil sump 28 in the base of the engine crank case, suitable means, such as a filtering device 29, being provided to prevent foreign matter finding its way through the pump into the oil manifold 5.

Extending upwardly from the oil manifold 5 is a series of pipes or conduits 31 provided with non-return check valves 32 opening into the oil chambers 10 and limited in their unseating movement by stops 33. These conduits 31 function in conjunction with a port arrangement provided in plates 34 and 35 superimposed on one another and secured over that face of the actuator housing through which the high ends of the chambers 10 open.

The plate 34 has a diagonal channel 36 in its face, which opens at its upper end to the chamber 10 of the exhaust valve 4 and at its lower end to a port 37 in the actuator housing. This port 37 opens into the lower part of the cylinder 11 of the plunger 12 which operates the inlet valve 3. The cylinder of each plunger has a similar port 37 leading thereto at its lower end and, in each case, this port of the cylinder of the exhaust valve plunger is connected by a passage 36 with the upper end of the inlet valve chamber 10, and on the other hand, the ports 37 of the cylinders of each inlet valve plunger is connected by a port 38 through the plate 34, a diagonal passage 39 in the plate 35 and a port 40 through the plate 34 with the upper end of the exhaust valve chamber 10.

These ports 37, leading to the cylinders of the plungers, are normally closed by the said plungers when they are depressed into contact with the base circle of the cams, but the said ports are disclosed upon the raising of the plungers in performing their valve actuating strokes; and the relationship of the inlet and exhaust cams is such that, speaking of any one cylinder of the engine, only one plunger is raised to a port-disclosing position at any one time, and the other plunger is maintained in a port-closing position throughout the entire actuation of the moving plunger. Consequently, this arrangement involves the principle, set forth in my co-pending application, Serial Number 180,119, hereinbefore referred to, of ensuring a closed valve-actuating body of oil in advance of the head of the plunger performing an actuating stroke, whilst this actuated plunger releases the oil in the chamber 10 of the other valve to flow, through one or other of the passages in the plates 34 or 35, under the influence of pressure oil, which is then free to pass into the relieved chamber 10 through the pipe 31 and check valve 32. The oil, so flowing, spills onto the camshaft beneath the raised plunger, and the spilled oil eventually finds its way through a drain pipe 38, back to the sump 28 of the engine.

This arrangement hereinbefore described provides a cylinder head structure and hydraulic valve gear combination, which includes provision for the automatic flushing to a certain extent of oil through the valve actuator chambers at desirably timed periods for the maintaining and replenishing of a solid column of oil in the said chambers, and the scavenging of entrained or accumulated air therefrom; but, where it is permissible or desirable as is sometimes so in the case of stationary engines, the automatic timing of the oil relief in the valve actuator chambers may be dispensed with and manually operable relief valves provided.

In Figure 6, the actuator chamber 10ª is completely enclosed except insofar as a valve 40 is seated in an opening 41 in the top of the actuator housing and leading from a high point in the said chamber 10ª. This valve is maintained seated by a plug 42 which may be manually unscrewed to permit the valve 40 to lift from its seat, whereby air and oil may then flow from the chamber through a suitably provided discharge opening 43 in the said plug. If such as when the engine has been at rest for some time, there is a possibility that air may have accumulated in the chamber 10ª, the valve 40 may be relieved manually as explained; and, upon operation of the engine, flow will take place through the pipe 31 and from the chamber 10ª, this condition being maintained until air-scavenging has been effected, after which the plug 42 is again screwed down to close the relief valve. The said relief valve 40 is shown as being formed and situated to actuate as a stop for the check valve 32.

As shown in Figure 5, a separate oil manifold 39 is provided in the cylinder head structure for conveying oil for the pump to the conduits 31 of the valve actuator chambers 10, and this arrangement may be employed where it was not desired to combine the pressure oil feed of the hydraulic gears directly or indirectly with the cooling system of the engine.

Among other advantages hereinbefore referred to, and obvious to those skilled in the art to which this invention appertains, is the servicing feature whereby the inner valve gear assembly of the whole engine may be replaced as a unit by the simple interchanging of one cylinder head combination for another, which interchanging only calls for the detachment of the connecting rod 22 from the camshaft crank 23, insofar as any mechanism is concerned, to permit the removal of the cylinder head, the hydraulic valve gears, the camshaft, the camshaft timing gears and the pump as a unit.

This invention may be developed within the scope of the following claims without departing from the essential features of the said invention, and it is desired that the specification and drawings be read as being merely illustrative and not in a limiting sense, except as necessitated by the prior art.

What we claim is:—

1. In combination with a cylinder head structure of an internal combustion engine, a self-contained valve actuating system incorporated in said structure, said system including hydraulic valve-lifting means, a camshaft operating said valve-lifting means, and a pump circulating hydraulic fluid to said valve-lifting means.

2. In combination with a cylinder head structure of an internal combustion engine, having chambers for the circulation of cooling fluid therethrough, a self-contained valve actuating system incorporated in said structure, said system including hydraulic valve-lifting means, a camshaft operating said valve-lifting means, said valve-lifting means being connected for fluid supply with a cooling chamber of said cylinder head, and a pump circulating hydraulic fluid to said valve actuating means through said cooling chamber.

3. In an engine, a detachable cylinder head unit comprising, in combination, a cylinder head structure, a self-contained valve actuating system in said head structure, including hydraulic valve-lifting means, a camshaft operating said valve-lifting means, a pump circulating hydraulic fluid to said valve-lifting means, an air bleed conduit from said valve-lifting means, and means controlled by said camshaft closing said conduit during valve-lifting operation of said means.

4. In combination with a cylinder head structure, an upper structure forming a valve actuator housing, puppet valves having their stems extending upwardly into said housing, a camshaft in said head structure, plungers operated by said camshaft extending into said housing, said housing being chambered to provide connecting chambers between the ends of said valve stems and said plungers, chambers inclined relative to horizontal plane of the head structure, said head structure being further chambered to provide a hydraulic fluid manifold supplying fluid to said chambers, and closable relief valves opening from regions of air accumulation in said chambers.

5. In combination with a cylinder head structure, an upper structure forming a valve actuator housing, puppet valves having their stems extending upwardly into said housing, a camshaft in said head structure, plungers operated by said camshaft extending into said housing, said housing being chambered to provide connecting chambers between the ends of said valve stems and said plungers, said head structure being further chambered to provide a hydraulic fluid manifold supplying fluid to said chambers, pump gearing operating said camshaft, and a pump casing housing said gearing and discharging into said manifold.

6. In combination with a cylinder head structure, an upper structure forming a valve actuator housing, puppet valves having their stems extending upwardly into said housing, a camshaft in said head structure, plungers operated by said camshaft extending into said housing, said housing being chambered to provide connecting chambers between the ends of said valve stems and said plungers, said head structure being further chambered to provide a hydraulic fluid manifold supplying fluid to said chambers, pump gearing operating said camshaft, a pump casing housing said gearing and discharging into said manifold, and closable relief valves opening from regions of air accumulation in said chambers.

7. In combination, a cylinder head structure chambered to provide a hydraulic fluid casing therein and including a fluid manifold having a passageway to said casing, a puppet valve having its stem exposed to the interior of said casing, a non-return valve opening from said manifold to said casing, timed mechanism in said head imposing pulsating pressure on fluid in said casing, and an outlet valve in said head opened by said timed mechanism to a region of air accumulation in said casing intermediate the imposing of pressure on fluid in said casing.

8. In combination, a cylinder head structure chambered to provide a hydraulic fluid casing therein and including a fluid manifold having a passageway to said casing, a puppet valve having its stem exposed to the interior of said casing, a fluid supply valve closing said passageway and sensitive to differential pressure in said manifold and said casing, timed mechanism in said head imposing pulsating pressure on fluid in said casing, and an outlet valve in said head opened by said timed mechanism to a region of air accumulation in said casing intermediate the imposing of pressure on fluid in said casing.

9. In combination, a cylinder head structure chambered to provide a hydraulic fluid casing therein and including a fluid manifold, a puppet valve having its stem exposed to the interior of said casing, a non-return valve opening from said manifold to said casing, an actuator plunger in said head operating against fluid in said casing, plunger operating means in said head, and an outlet valve in said head opened by said means alternately to the operation of said plunger, said outlet valve opening from a region of air accumulation in said chamber.

10. In combination, a cylinder head structure chambered to provide a hydraulic fluid casing therein and including a fluid manifold, a puppet valve having its stem exposed to the interior of said casing, a non-return valve opening from said manifold to said casing, a cam-operated plunger in said head imposing intermittent pressure on fluid in said casing, a cam-operated outlet valve in said head opening from a region of air accumulation in said casing, a common camshaft in said head alternately operating said plunger and said outlet valve.

In testimony whereof we affix our signatures.

WARREN NOBLE.
LEON V. PITTMAN.